E. W. HERENDEEN.

Improvement in Harrows.

No. 120,195.            Patented Oct. 24, 1871.

Witnesses:
John K. Burke

Inventor:
E. W. Herendeen
By W. S. Longbrough &co
Atty Rochester N.Y.

UNITED STATES PATENT OFFICE.

EDWARD W. HERENDEEN, OF GENEVA, NEW YORK.

IMPROVEMENT IN HARROWS.

Specification forming part of Letters Patent No. 120,195, dated October 24, 1871.

*To all whom it may concern:*

Be it known that I, EDWARD W. HERENDEEN, of Geneva, in the county of Ontario and State of New York, have invented certain Improvements in Harrows, of which the following is a specification:

My invention relates to an improved implement for pulverizing the soil, provided with round or nearly-round inclined teeth, by which a fine tilth is produced, either upon cultivated lands or among growing crops.

Figure 1:
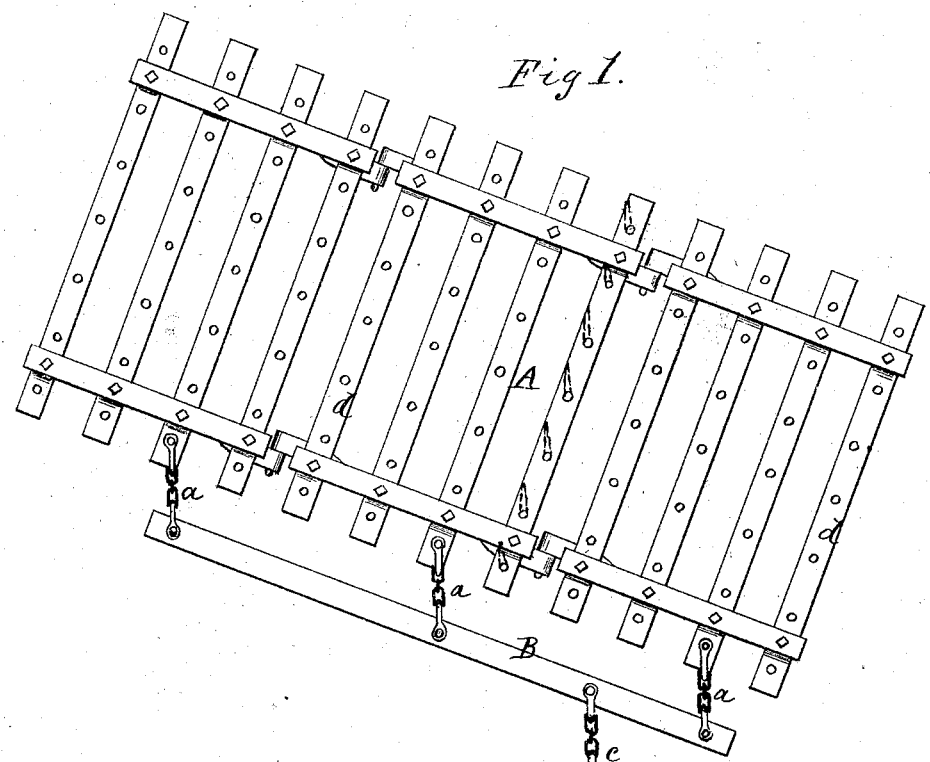
Figure 2:
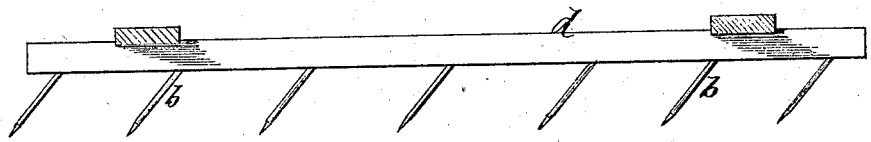
Figure 3:
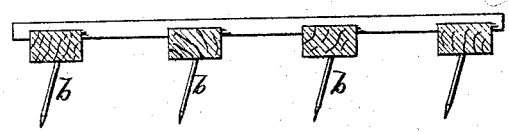

In the drawing, Figure 1 is a plan view of my invention. Figs. 2 and 3 are side elevations of portions of my device.

It is well known that the ordinary harrow with its square perpendicular teeth clogs easily by accumulating grass and weeds upon the teeth; that there is a large amount of friction incurred in dragging it through the soil; and that such an implement will not finely pulverize the lumps. Moreover, it is impossible to use it upon growing crops with any advantage without destroying the roots of the plants as well as the weeds. My invention is designed to obviate these difficulties.

The harrow-frame A is constructed in the usual manner with beams $d$ and suitable cross-ties, the several sections being hinged together in a suitable manner. The teeth $b$ are formed from bars of round or nearly-round steel, sharpened at one end and driven into holes prepared in the beams $d$ at an angle both longitudinally and laterally with the beams, as indicated in Figs. 2 and 3, and by dotted lines in Fig. 1. By this means the teeth lie inclined nearly or quite in the line of draft of the harrow, and, instead of pushing the lumps of soil to one side, they cut downward through them, thus effecting a thorough pulverization. The teeth also, being of steel and circular in section, soon become polished, and the draft consequently rendered comparatively light, while their inclination avoids the possibility of their becoming clogged. Furthermore, by the reduction of friction upon the teeth the harrow may be made considerably wider in its sweep than those formerly used, enabling the attendant to accomplish a much greater amount of work than was heretofore possible in the same time. Also, the beams $d$ and the teeth in them are arranged in such a manner that nearly double the number of teeth found in the ordinary harrow is employed in a given size, their diameter being, however, considerably less, whereby, by their action, the soil is reduced to a degree of pulverization unattainable by any other implement. The shape, distribution, and inclination of the teeth $b$ also enables me to use the harrow among growing crops, such as young corn, barley, or other spring grains, and winter wheat, since the surface of the ground is thoroughly disturbed and pulverized while the roots of the plants are pressed into the soil. My invention is also peculiarly adapted to scattering manure and other fertilizers which need pulverizing, since, as before described, it is finely divided by the action of the inclined teeth, and evenly distributed over the surface on account of their arrangement and contiguity.

I usually construct the harrow in three sections, hinged together, as indicated, and in order to equalize the draft upon each section I provide the bar B, Fig. 1, which is attached to the sections by draw-chains $a$. The chains are of such a length that each section may have a vertical movement independently of the others, while their relative length is such that the strain usually imposed upon the hinges of the sections is thereby transmitted directly to the equalizing-bar. The team is attached to this bar by a connection, $c$, at such a point as to cause the harrow to advance angularly, as shown, thus preserving the relative line of advance for each succeeding tooth between the paths of the preceding ones, as is usual in this class of implements. To regulate this angular position the connection $c$ may be adjusted along the bar B.

By my invention I provide an implement of great value to farmers and others, performing a class of work which has never before been done, except by slow and tedious processes, as regards corn; and in relation to broadcast crops, when their cultivation has been attempted, the experiments have proved very unsatisfactory and destructive to the roots of the plants.

I claim—

A harrow for pulverizing the soil and for cultivating growing crops, composed of two or more sections provided with small teeth inserted obliquely through the frame, substantially as and for the purposes set forth.

E. W. HERENDEEN.

Witnesses:
F. H. CLEMENT,
D. L. JOHNSTON.